United States Patent
Meizlish

(10) Patent No.: US 6,810,635 B2
(45) Date of Patent: Nov. 2, 2004

(54) AUTOMOTIVE WINDOW TRIM MOLDING

(76) Inventor: Steven R. Meizlish, 80 Northridge Rd., Columbus, OH (US) 43214

( * ) Notice: Subject to any disclaimer, the term of this patent is extended or adjusted under 35 U.S.C. 154(b) by 50 days.

(21) Appl. No.: 09/986,499

(22) Filed: Nov. 9, 2001

(65) Prior Publication Data

US 2003/0090122 A1 May 15, 2003

(51) Int. Cl.[7] .................................................. E04C 2/38
(52) U.S. Cl. ...................... 52/716.5; 52/716.8; 52/208; 52/204.597; 52/746.1; 296/93; 296/201
(58) Field of Search .............................. 52/716.5, 716.8, 52/171.01, 208, 204.597, 746.1, 717.01; 296/93, 201

(56) References Cited

U.S. PATENT DOCUMENTS

| | | | |
|---|---|---|---|
| 4,849,468 A | * | 7/1989 | Murachi et al. ............. 524/523 |
| 4,987,699 A | | 1/1991 | Gold ............................ 49/375 |
| 5,088,787 A | * | 2/1992 | Gross ........................... 296/93 |
| 5,273,338 A | * | 12/1993 | Gooding et al. ........ 296/146.15 |
| 5,338,087 A | | 8/1994 | Gross et al. ........... 296/146.15 |
| 5,419,088 A | * | 5/1995 | Raymond et al. ................ 52/1 |
| 5,480,207 A | | 1/1996 | Gold ........................... 296/93 |
| 5,603,546 A | * | 2/1997 | Desir, Sr. ...................... 296/93 |
| 5,624,148 A | | 4/1997 | Young et al. ................. 296/93 |
| 5,759,679 A | * | 6/1998 | Kitamura et al. ......... 428/317.3 |
| 5,842,731 A | | 12/1998 | Gold ........................... 296/93 |
| 6,257,644 B1 | * | 7/2001 | Young .......................... 296/93 |
| 6,460,300 B2 | * | 10/2002 | Mikkaichi et al. ..... 52/204.597 |

* cited by examiner

*Primary Examiner*—Carl D. Friedman
*Assistant Examiner*—Naoko Slack
(74) *Attorney, Agent, or Firm*—Wood, Herron & Evans LLP

(57) ABSTRACT

An automotive window trim molding for fixed glass windows is formed from a flexible polymeric material and has a channel section for receiving an edge of a fixed glass window. A double-sided adhesive foam tape is provided on an interior wall of the channel section to bond the molding to a glass panel received within the channel.

24 Claims, 2 Drawing Sheets

AUTOMOTIVE WINDOW TRIM MOLDING

FIELD OF THE INVENTION

The present invention pertains to trim molding for automobiles, and more particularly to a window trim molding for fixed windows.

BACKGROUND OF THE INVENTION

Window trim molding is commonly used in fixed window installations for automobiles to seal against wind and water, and also to provide an aesthetically pleasing fit and finish by covering the gap around the window installation, between the window and the automobile. This type of window trim molding is often referred to as "reveal molding." The molding is installed to the perimeter of automobile window glass prior to installation in the automobile wherein the glass is generally attached to an opening in a body panel with a urethane adhesive. Automotive window trim molding is well known in the art and is generally attached to the perimeter of the glass using a sealant, such as butyl. The sealant may be pre-applied to the molding prior to installation of the molding on the glass.

Prior art window trim moldings suffer several drawbacks. For example, the butyl sealant used to attach the molding to the glass is temperature sensitive and will not perform well if environmental conditions are too hot or too cold. If the temperature is too hot, butyl sealants tend to soften, and if the temperature is too cold, butyl sealants tend to become brittle. Butyl sealants are also messy to apply. They spread easily to portions of the glass where the sealant is not desired and may get on the hands or clothing of the person installing the molding. Furthermore, when the sealant is pre-applied to the molding prior to installation of the molding on the glass, subsequent handling of the molding is hindered by the sealant on the molding.

In some prior designs, improved gripping of window trim molding to automotive glass has been attempted by forming the molding from relatively stiff polymeric materials. However, these stiffer moldings are more difficult to install to the perimeter of the glass, compared to molding made from softer polymers, especially around corner portions, as a result of the accompanying decrease in flexibility. Because butyl sealants do not create the necessary bond between the molding and the fixed window, additional urethane adhesive is generally applied beneath the molding to hold the molding in place during the service life of the automobile.

For at least these reasons, a need exists for a window trim molding which can be easily applied to the perimeter of an automobile window glass, and which overcomes the disadvantages of butyl sealants and stiff polymeric materials.

SUMMARY OF THE INVENTION

The present invention provides an improved automotive window trim molding which can be quickly and easily applied to the perimeter of a fixed automotive glass panel prior to installation on an automobile body. The window trim molding of the present invention is formed from a relatively soft polymeric material which provides sufficient pliability and flexibility to form to the contours of an automotive glass, especially around the corner portions of the glass. The molding is formed with a channel section which receives an edge portion of the automotive glass.

A double-sided adhesive foam tape, having adhesive applied to both sides of the tape, is applied to the interior portion of the channel so that the double-sided adhesive foam tape may bond to both the window trim molding and the glass panel inserted into the channel. Advantageously, the window trim molding may be bonded to the peripheral edge of the glass panel. The molding is provided with a release liner applied to the exposed side of the adhesive foam tape to prevent premature adhesion of the foam tape prior to installation.

To apply the window trim molding of the present invention to a glass panel, the release liner is removed from the interior of the channel and the molding is fitted to the perimeter of the glass panel by hand. Because the molding is made from a relatively soft elastomer, installers may spread the legs of the channel using their fingers without the danger of getting butyl sealant on their hands during the installation process. The adhesive foam tape accommodates imperfections in the surface of the edge of the glass panel to ensure adequate bonding of the molding and to provide a clean finished look to the installed molding.

In another aspect of the invention, an automotive glass installation includes a fixed glass panel sized to fit in an opening of an automobile body and a window trim molding adhered to the perimeter of the glass panel by a double-sided adhesive foam tape which has been previously bonded to an interior portion of the molding.

In yet another aspect of the invention, a method for installing a fixed glass panel in an automobile includes the steps of providing a window trim molding having a double-sided adhesive foam tape bonded to an interior portion of the molding, fitting the molding around the peripheral edge of the glass panel to bond to the molding to the glass panel, preparing the automobile body to receive the glass panel and molding, and installing the glass panel and molding onto the automobile.

These and other advantages, objectives and features of the invention will become more readily apparent to those of ordinary skill upon review of the following detailed description. The preferred embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
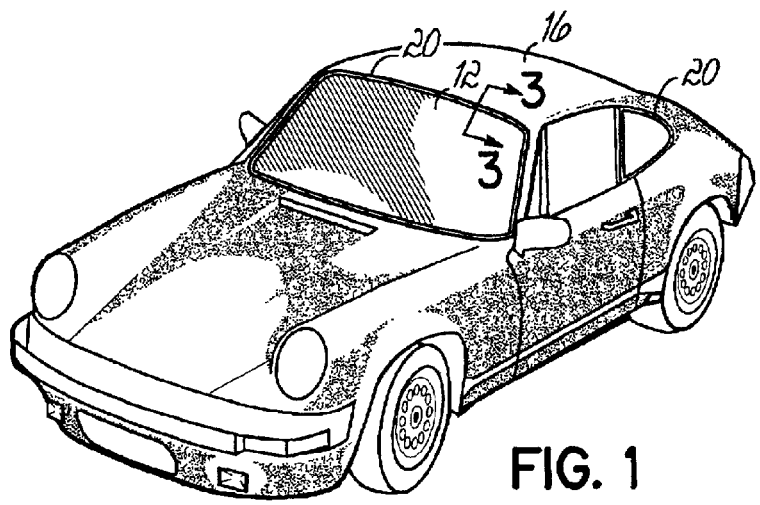
FIG. 1 is a perspective view of an automobile having fixed glass panels and window trim molding.
Figure 2:
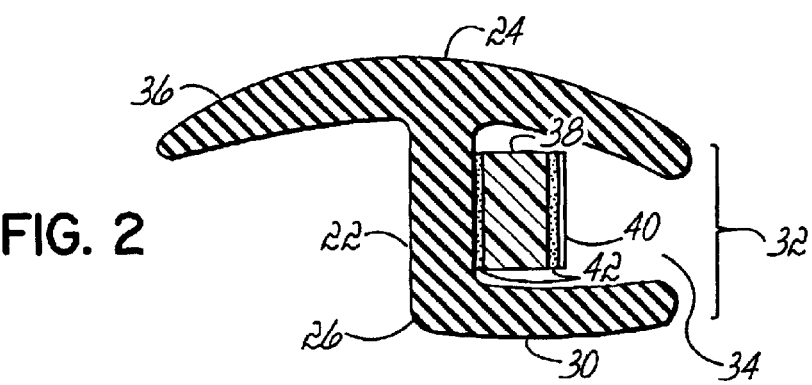
FIG. 2 is a cross-section of an exemplary window trim molding of the present invention.

FIG. 1 shows an automobile 10 with fixed glass windows 12, 14, installed on the automobile body 16 with a window trim molding 20 according to the principles of the present invention. Referring to FIG. 2, a cross-section of an exemplary embodiment of a molding 20a according to the present invention is shown. The molding 20a is formed from a polymeric material and in an exemplary embodiment it is formed from polyvinyl chloride (PVC). In another exemplary embodiment, the polymer forming the molding has a hardness of at least 80 Shore-A durometer and not more than 90 Shore-A durometer. The molding 20a may be formed by an extrusion, compression molding, injection molding, or other manufacturing processes.

Referring to FIG. 2, the exemplary molding 20a of the present invention includes a back wall 22 having a first end 24 and a second end 26. First and second sidewalls 28, 30 extend from the first and second ends 24, 26 of the back wall 22, respectively. The first and second sidewalls 28, 30 are oriented in a substantially opposing relationship and, together with the back wall 22, define a channel section 32 of the molding 20a. The channel section 32 has an interior portion 34 for receiving a glass panel such that a peripheral edge of the glass panel faces the back wall 22 and the first and second sidewalls 28, 30 are adjacent opposite sides of the glass panel. The molding 20a further includes a third sidewall 36 extending from an end of the back wall 22 in a direction substantially opposite the first and second sidewalls 28, 30. In the exemplary embodiment shown in FIG. 2, the third sidewall 36 extends from the first end 24 of the back wall 22.

A double-sided adhesive foam tape 38 (i.e., a foam tape having adhesive coating 42 on both sides of the tape) is bonded to the molding 20a on an interior portion 34 of the channel section 32. In the exemplary embodiment shown in FIG. 2, the double-sided adhesive foam tape 38 is bonded to the back wall 22 of the molding 20a. The side of the adhesive foam tape 38 facing away from the back wall 22 may be provided with a release liner 40 to protect the adhesive 42 and prevent premature bonding to articles which may come in contact with the adhesive 42. In use, the release liner 40 may be peeled away from the double-sided adhesive foam tape 38 to expose the adhesive 42. The molding 20a may then be applied to a peripheral edge of an automotive window glass by fitting the edge of the glass inside the channel section 32 to mate with the adhesive foam tape 38. Advantageously, the adhesive foam tape 38 conforms to irregularities in the edge of the glass panel and the adhesive 42 provides a secure bond to the glass to fix the molding 20a in place.

The molding 20a is flexible and may be easily applied around the perimeter of the glass panel by hand. Another advantage of the molding 20a of the present invention is that an installer may use their fingers to pry apart the first and second sidewalls 28, 30 of the channel section 32 to make installation of the molding 20a to the glass panel much easier. Because the adhesive 42 is disposed on the double-sided adhesive foam tape 38, the installer's fingers do not come in contact with the adhesive 42. This is an advantage over conventional window trim moldings which require a sealant such as butyl to be installed into a channel section prior to fitting the molding onto a glass panel, whereby contact with the butyl is likely when handling the molding.

The double-sided adhesive foam tape 38 may be formed from a chloroprene material, commonly known by the trade name Neoprene®. The adhesive foam tape 38 may further include other materials such as styrene butadiene rubber (SBR) and ethylene propylene diene monomer (EPDM). While the double-sided adhesive foam tape 38 is shown in FIG. 2 to be bonded to the back wall 22 of the molding 20a, it may also be bonded to the first sidewall 28 or the second sidewall 30 within the interior 34 of the channel section 32.

The window trim molding 20 of the present invention may generally be installed to a glass panel of an automobile 10 prior to installation in an opening of the automobile body 16. An adhesive such as urethane is applied either to the automobile body 16, around the opening for receiving the glass panel, generally on a ledge known as a pinch-weld, or it may be installed to the perimeter of the glass panel in an area of the glass which will contact the automobile body 16 at the pinch-weld.

Figure 3:
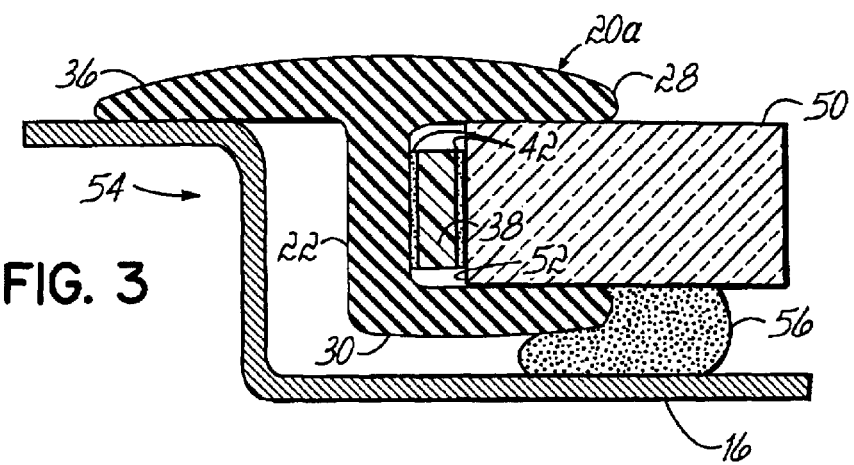
FIG. 3 is a partial section of the fixed glass installation of FIG. 1, taken along line 3—3.

FIG. 3 shows a cross-section of a typical window glass installation incorporating a molding 20a according to the principles of the present invention. A fixed glass panel 50 is received into the channel section 32 of the molding 20a, between the first sidewall 28 and the second sidewall 30. An edge 52 of the glass panel 50 is bonded to the back wall 22 of the molding 20a by the double-sided adhesive foam tape 38. Advantageously, the adhesive foam tape 38 is compressed between the edge 52 of the glass panel 50 and the back wall 22 of the molding 20a to accommodate surface irregularities on the edge 52 of the glass 50. The compression of the adhesive foam tape 38 ensures a secure bond and serves to seal perimeter of the glass 50. The adhesive foam tape 38 also insulates the automobile interior against noise from wind and frictional rubbing of the glass 50 in the molding 20a as the automobile body 16 articulates.

The fixed glass panel 50 and molding 20a are positioned within a recess 54 formed around an opening in the automobile body 16 and sized to receive the glass panel 50. A urethane adhesive 56 bonds the glass panel 50 and molding 20a to the automobile body 16 and may be applied to the glass panel 50 or the automobile body 16 prior to installation of the glass 50. As shown in FIG. 3, when the molding 20a and glass panel 50 have been installed, the third sidewall 36 of the molding 20a extends across the recess 54 to cover the space between the glass panel 50 and the recess 54 to provide an aesthetically pleasing appearance to the window installation and to further seal wind, water, or other elements from entering the automobile interior.

Figure 4:
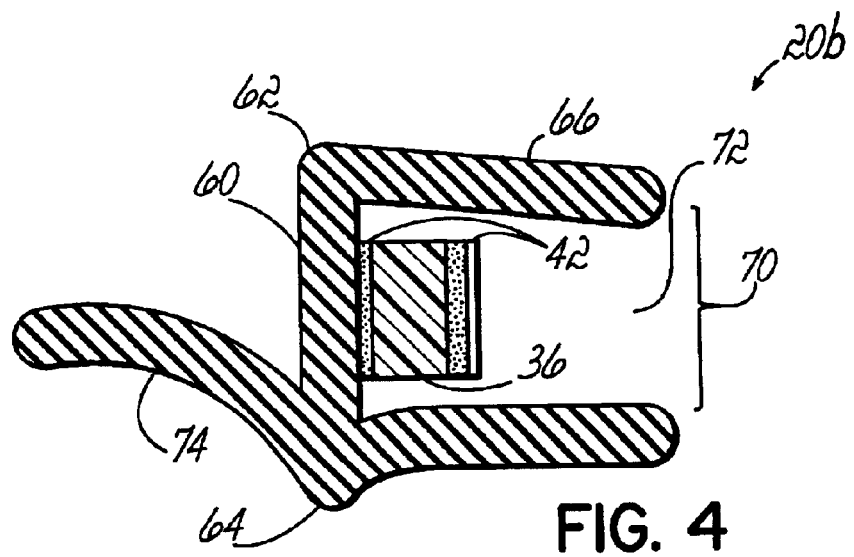
FIG. 4 is a cross-section of an alternate exemplary window trim molding of the present invention.

Referring to FIG. 4, another exemplary window trim molding 20b of the present invention is shown. The molding 20b includes a back wall 60 having a first end 62 and a second end 64, and includes first and second sidewalls 66, 68 extending from the first and second ends 62, 64 of the back wall 60, as described above for the molding 20a of FIG. 2. The first and second sidewalls 66, 68 are oriented in a substantially opposing relationship and, together with the back wall 60, define a channel section 70 of the molding 20b. The channel section 70 has an interior portion 72 for receiving a glass panel such that a peripheral edge of the glass panel faces the back wall 60 and the first and second sidewalls 66, 68 are adjacent opposite sides of the glass panel. In this exemplary embodiment, a third sidewall 74 of the molding 20b extends from the second end 64 of the back wall 60. The third sidewall 74 may have an arcuate shape with a convex angled toward the back wall 60.

A double-sided adhesive foam tape 38, as described above, is bonded to the interior 72 of the channel section 70. In the exemplary embodiment shown in FIG. 4, the double-sided adhesive foam tape 38 is bonded to the back wall 60 of the molding 20b, however, the adhesive foam tape 38 may alternatively be bonded on either the first sidewall 66 or the second sidewall 68 of molding 20b. A release liner 40 may be provided on the adhesive foam tape 38 to protect the adhesive 42 and prevent premature bonding.

Figure 5:
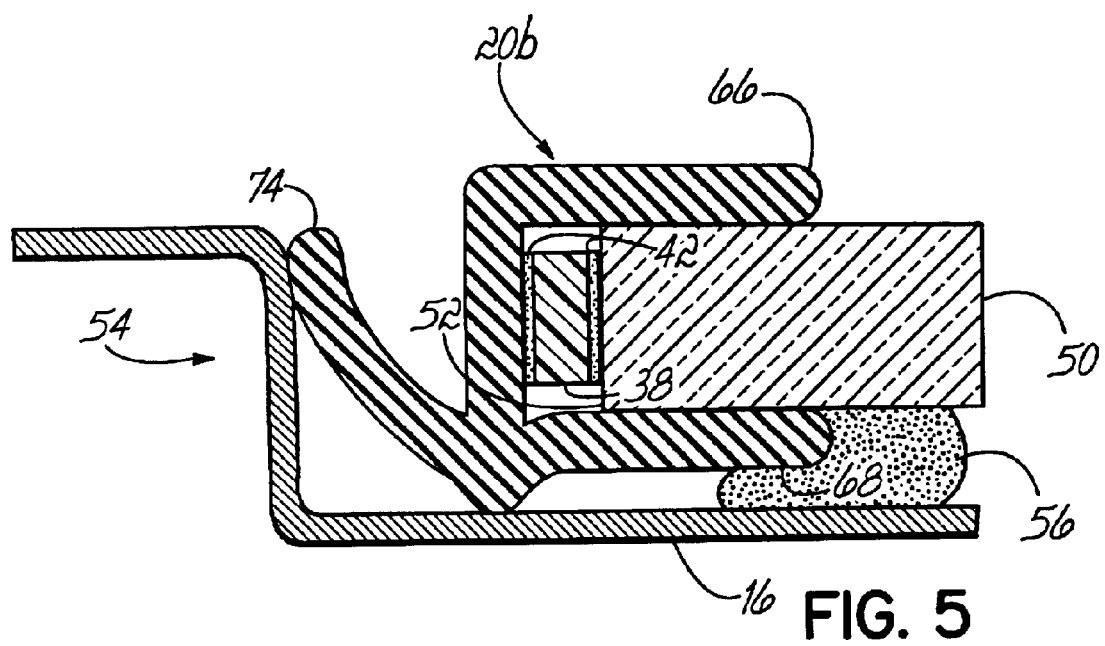
FIG. 5 is a partial section of a fixed glass installation similar to FIG. 3, depicting the window trim molding of FIG. 4.

The window trim molding 20b of the exemplary embodiment shown in FIG. 4 may be installed to the perimeter of a fixed automotive glass panel 50 in a similar fashion as described above for the molding 20a and FIG. 3. FIG. 5 depicts an automotive glass installation incorporating the window trim molding 20b shown in FIG. 4. A fixed glass panel 50 is received into the channel section 70 of the molding 20b, between the first sidewall 66 and the second sidewall 68. An edge 52 of the glass panel 50 is bonded to the back wall 60 of the molding 20b by the double-sided adhesive foam tape 38. Advantageously, the adhesive foam tape 38 is compressed between the edge 52 of the glass panel 50 and the back wall 60 of the molding 20b to accommodate surface irregularities on the edge 52 of the glass 50. The compression of the foam tape 38 ensures a secure bond and serves to seal the edge 52 of the glass 50. The adhesive foam tape 38 also insulates the automobile interior against noise from wind and frictional rubbing of the glass 50 in the molding 20b as the automobile body 16 articulates.

The fixed glass panel 50 and molding 20b are positioned within a recess 54 formed around an opening in the automobile body 16 and sized to receive the glass panel 50. A urethane adhesive 56 bonds the glass panel 50 and molding 20b to the automobile body 16 and may be applied to the glass panel 50 or the automobile body 16 prior to installation of the glass 50. As shown in FIG. 5, when the molding 20b and glass panel 50 have been installed, the third sidewall 74 of the molding 20b extends across the space between the glass panel 50 and the recess 54 to positively contact the automobile body 16 without extending over the surface of the automobile body 16. In this manner, the molding 20b provides an aesthetically pleasing appearance to the window installation and seals wind, water, or other elements from entering the automobile interior.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A trim molding for circumscribing a glass panel fixed within an opening of an automobile, the glass panel having a peripheral edge, the molding trim comprising:
   a back wall, said back wall having a first end and a second end;
   first and second substantially opposing sidewalls proximate said first and second ends, respectively, of said back wall, and defining a channel section together with said back wall, said channel section having an interior for receiving the peripheral edge of the glass panel;
   double-sided adhesive foam tape disposed on at least one of said back wall, said first sidewall, and said second sidewall, within said interior of said channel section, to bond the glass panel to the molding; and
   a third sidewall extending from/an end of said back wall in a direction substantially opposite said first and second sidewalls.

2. The trim molding of claim 1 wherein said third sidewall extends from said first end of said back wall.

3. The trim molding of claim 1 wherein said third sidewall extends from said second end of said back wall.

4. The trim molding of claim 1 wherein said third sidewall arcuately extends from said second end of said back wall such that a convex of the arc is angled toward said back wall.

5. The trim molding of claim 1 wherein said adhesive foam tape is disposed on said back wall to bond the molding to the peripheral edge of the glass panel.

6. The trim molding of claim 1 wherein said back wall and said sidewalls are formed from polymeric material:
   the polymeric material having a hardness of at least 80 Shore-A durometer; and
   the polymeric material having a hardness no more than 90 Shore-A durometer.

7. The trim molding of claim 1 wherein said back wall and said sidewalls are formed from an extruded polymer.

8. The trim molding of claim 1 wherein said back wall and said sidewalls are formed from polyvinyl chloride.

9. The trim molding of claim 1 wherein the double-sided adhesive foam tape is formed from a foam comprising chloroprene.

10. The trim molding of claim 9 wherein the foam further comprises:
    styrene butadiene rubber (SBR); and
    ethylene propylene diene monomer (EPDM).

11. The trim molding of claim 1 further comprising:
    a liner disposed on a side of said double-sided adhesive foam tape to prevent premature adhesion of the adhesive foam tape.

12. An automotive glass installation comprising:
    a fixed glass panel for an automobile, said glass panel sized to fit within an opening in an automobile and having a peripheral edge; and
    a trim molding adhered to said peripheral edge of said glass, the trim molding including:
        a back wall, said back wall having a first end and a second end,
        first and second substantially opposing sidewalls proximate said first and second ends, respectively, of said back wall, and defining a channel section together with said back wall, said channel section having an interior for receiving said peripheral edge of said glass panel,
        double-sided adhesive foam tape disposed on at least one of said back wall, said first sidewall, and said second sidewall, within said interior of said channel section, to bond said glass panel to said trim molding, and
        a third sidewall extending from an end of said back wall in a direction substantially opposite said first and second sidewalls.

13. The automotive glass installation of claim 12 wherein said third sidewall extends from said first end of said back wall.

14. The automotive glass installation of claim 12 wherein said third sidewall extends from said second end of said back wall.

15. The automotive glass installation of claim 12 wherein said third sidewall arcuately extends from said second end of said back wall such that a convex of the arc is angled toward said back wall.

16. The automotive glass installation of claim 12 wherein said adhesive foam tape is disposed on said back wall to bond said trim molding to said peripheral edge of said glass panel.

17. The automotive glass installation of claim 12 wherein said back wall and said sidewalls are formed from polymeric material:
    the polymeric material having a hardness of at least 80 Shore-A durometer; and
    the polymeric material having a hardness no more than 90 Shore-A durometer.

18. The automotive glass installation of claim 12 wherein said back wall and said sidewalls are formed from an extruded polymer.

19. The automotive glass installation of claim 12 wherein said back wall and said sidewalls are formed from polyvinyl chloride.

20. The automotive glass installation of claim 12 wherein said double-sided adhesive foam tape is formed from a foam comprising chloroprene.

21. The automotive glass installation of claim 12 wherein said double-sided adhesive foam tape further comprises:

styrene butadiene rubber (SBR); and ethylene propylene diene monomer (EPDM).

22. The automotive glass installation of claim 12 further comprising:

a liner disposed on a side of said double-sided adhesive foam tape to prevent premature adhesion of the adhesive foam tape.

23. A method for installing a fixed glass panel having a peripheral edge within an opening of an automobile body, the method comprising the steps of:

providing a trim molding having a channel section, the channel section including double-sided adhesive foam tape disposed on a wall of the channel section to engage a peripheral edge of a glass panel received within the channel section;

fitting the trim molding to the peripheral edge of the glass panel such that the peripheral edge of the glass panel is received within the channel section;

bonding the peripheral edge of the glass pane to the molding with the adhesive foam tape;

preparing the automobile body to receive the glass panel; and installing the glass panel within the opening of the automobile body.

24. The method of claim 23 further including the step of:

removing a liner from the adhesive foam tape prior to fining the trim molding to the peripheral edge of the glass panel.

* * * * *

UNITED STATES PATENT AND TRADEMARK OFFICE
CERTIFICATE OF CORRECTION

PATENT NO. : 6,810,635 B2
DATED : November 2, 2004
INVENTOR(S) : Steven R. Meizlish It is certified that error appears in the above-identified patent and that said Letters Patent is hereby corrected as shown below:

Column 5,
Line 58, reads "...a third sidewall extending from/an end of..." and should read -- ...a third sidewall extending from an end of... --.

Column 8,
Line 17, reads "...prior to fining the trim molding to..." and should read -- ...prior to fitting the trim molding to... --.

Signed and Sealed this

Twenty-ninth Day of November, 2005

JON W. DUDAS
*Director of the United States Patent and Trademark Office*